US011916206B2

(12) United States Patent
Belharouak et al.

(10) Patent No.: US 11,916,206 B2
(45) Date of Patent: Feb. 27, 2024

(54) EFFICIENT RECOVERY PROCESSES FOR THE BLACK MASS FROM SPENT LITHIUM-ION BATTERIES

(71) Applicant: UT-Battelle, LLC, Oak Ridge, TN (US)

(72) Inventors: Ilias Belharouak, Oak Ridge, TN (US); Yaocai Bai, Oak Ridge, TN (US); Jianlin Li, Oak Ridge, TN (US); Rachid Essehli, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 598 days.

(21) Appl. No.: 17/177,120

(22) Filed: Feb. 16, 2021

(65) Prior Publication Data

US 2021/0257685 A1  Aug. 19, 2021

Related U.S. Application Data

(60) Provisional application No. 62/976,464, filed on Feb. 14, 2020.

(51) Int. Cl.
*H01M 10/54* (2006.01)
(52) U.S. Cl.
CPC .................................. *H01M 10/54* (2013.01)
(58) Field of Classification Search
CPC ...... H01M 10/54; H01M 4/505; H01M 4/525; H01M 4/587; H01M 4/625; H01M 4/661; H01M 10/0525; Y02E 60/10; Y02W 30/84
See application file for complete search history.

(56) References Cited

U.S. PATENT DOCUMENTS

2021/0242514 A1* 8/2021 Chen ...................... H01M 6/52

OTHER PUBLICATIONS

He et al., "Recovery of Cathode Materials and Al From Spent Lithium-ion Batteries by Ultrasonic Cleaning," Waste Management, http://dx.doi.org/10.1016/j.wasman.2015.08.035 (2015).
Wang et al., "Efficient Separation of Aluminum Foil and Cathode Materials From Spent Lithium-ion Batteries Using a Low-Temperature Molten Salt," ACS Sustainable Chem. Eng. 7, 8287-8294 (2019).
Zeng et al., "Innovative Application of Ionic Liquid to Separate Al and Cathode Materials From Spent High-Power Lithium-ion Batteries," Journal of Hazardous Materials 271, 50-56 (2014).

* cited by examiner

*Primary Examiner* — George R Koch
*Assistant Examiner* — Christopher C Caillouet
(74) *Attorney, Agent, or Firm* — WARNER NORCROSS + JUDD LLP

(57) ABSTRACT

A method of recycling lithium-ion batteries is disclosed. The method includes isolating a composite electrode that comprises an electrode material adhered to a current collector with a polyvinylidene difluoride (PVDF) binder from a spent lithium-ion battery. The method also includes contacting the composite electrode in a polyol fluid capable of releasing the PVDF binder from the current collector without substantially altering either component. The composite electrode may be a cathode or an anode. The method also includes rapidly delaminating the electrode material from the current collector to give a free electrode material and a free current collector, and recovering each of the free electrode material and the free current collector from the mixture. The free electrode material may be reused to prepare another composite electrode, as well as a lithium-ion battery comprising the same, which are also disclosed.

20 Claims, 13 Drawing Sheets under the assumption that its reaction time and the nature of PVDF described above, commonly available solvents that are capable of dissolving PVDF under workable conditions, such as N-methyl-2-pyrrolidone (NMP) and dimethylformamide (DMF), are volatile and toxic and thus limited with regard to scale-up. Other reaction media, such as $AlCl_3$—NaCl molten salt and deep eutectic choline chloride/glycerol solvents have also been investigated, but failed to effectuate a useful separation of cathode materials from aluminum foils without altering both the morphology and composition of the recovered cathode materials.

EFFICIENT RECOVERY PROCESSES FOR THE BLACK MASS FROM SPENT LITHIUM-ION BATTERIES

CROSS-REFERENCE TO RELATED APPLICATIONS

This application claims the benefit of U.S. Provisional Application 62/976,464, filed Feb. 14, 2020, the content of which is hereby incorporated by reference in its entirety.

STATEMENT REGARDING FEDERALLY SPONSORED RESEARCH AND DEVELOPMENT

The invention described in this disclosure arose in the performance of Prime Contract No. DE-AC05-00OR22725 awarded by the U.S. Department of Energy. The U.S. government has certain rights in the invention.

FIELD OF THE DISCLOSURE

The present disclosure relates generally to battery recycling and, more specifically, to a method of directly recycling spent lithium-ion batteries by recovering reusable components therefrom.

BACKGROUND OF THE DISCLOSURE

Since their commercialization in the early 1990s, lithium-ion batteries have been widely used to power consumer electronics. Meanwhile, they are gaining increasing popularity in electric vehicles (e.g. electric vehicles (EVs), hybrid vehicles (HVs), plug-in hybrid vehicles (PHVs), etc.) owing to their high-energy density and long cycle life. However, in addition to growing adoption and development of lithium-ion battery-powered technologies, there is an increasing concern of flooding the market with end-of-life batteries. Specifically, estimates projecting that over 11 million metric tons of lithium-ion batteries will approach end-of-life in the decade between 2020-2030. Unfortunately, the vast majority of such end-of-life lithium-ion batteries have historically ended up in landfills, increasing potential risks of contamination to local soil and groundwater and removing useful materials from many electronic supply chains. Despite these mounting concerns, there is still a severe lack of incentive to recycle spent lithium-ion batteries, with estimates indicating that fewer than 5% of all lithium-ion batteries are being recycled at present.

In terms of the economy of recycling, most of the recoverable value in spent lithium-ion batteries is in the cathode, as that component constitutes the major value added in production. As such, state-of-the-art recycling approaches involving pyrometallurgical and hydrometallurgical processes have been increasingly developed and optimized for the recovery of metals from spent cathodes. However, pyrometallurgy is energy-intensive and cannot reclaim lithium, and hydrometallurgy involves caustic reagents (e.g. hydrochloric and nitric acids) and requires complicated purification and separation steps.

Direct recycling has recently been proposed in attempts to recover cathode materials with still-useful morphology and preserved chemical structures. Specifically, direct recycling processes aim to maintain the morphology of the recovered electrode materials to save efforts involved with subsequent regeneration processes, while also minimizing impurities (e.g. from current collectors and side reaction products) to circumvent both complex separation processes and contamination of the re-usable active materials being recovered. It will be appreciated that such an approach has the possibility to lower the overall number of recycling steps preceding new cell manufacturing, thereby reducing energy consumption (and hence, battery cost) while also alleviating environmental impacts by reducing greenhouse gas and SOx emissions.

Unfortunately, efficiently separating electrode materials from adjacent current collectors represents a major challenge for direct recycling and the metallurgical processes above. Specifically, an adhesive binder is typically employed between electrode films and current collectors in order to achieve longer cycle life and higher energy densities and increase long-term stability of the batteries. One such binder employed for these purposes is polyvinylidene difluoride (PVDF), which is a highly non-reactive thermoplastic fluoropolymer prepared by polymerization of vinylidene difluoride (i.e., 1,2-difluoroethylene). PVDF is one of the most commonly binders used for cathodes of lithium ion batteries due to its superior electrochemical and thermal stability and excellent adhesion between current collectors and electrode films. Unfortunately, these same properties (i.e., strong adhesion coupled with high resistance to solvents, acids, and hydrocarbons) increase the difficulty and complexity of recycling batteries using such composite electrodes by necessitating inefficient and energy intensive pre-treatment steps to for separating the electrode components. However, this pretreatment is important for improving the recycling efficiency, as well as for reducing the energy consumption associated with the subsequent separation processes.

With regard to direct recycling in particular, workable separation process are even more limited due to the necessary preservation of active materials being recovered. As such, several approaches have recently attempted, but ultimately failed, to meet the requirements for direct cathode recycling. For example, high-temperature thermal treatments effectively decompose PVDF, but affect both the crystal structure and the morphology of the active materials, while also releasing hydrogen fluoride (HF). Another separation approach involves dissolving PVDF with an organic solvent in a relatively straightforward method. However, owing to the nature of PVDF described above, commonly available solvents that are capable of dissolving PVDF under workable conditions, such as N-methyl-2-pyrrolidone (NMP) and dimethylformamide (DMF), are volatile and toxic and thus limited with regard to scale-up. Other reaction media, such as $AlCl_3$—NaCl molten salt and deep eutectic choline chloride/glycerol solvents have also been investigated, but failed to effectuate a useful separation of cathode materials from aluminum foils without altering both the morphology and composition of the recovered cathode materials.

As such, while direct recycling processes remain promising in terms of potential recycling process capable of wide-spread adoption (e.g. to mitigate and manage the growing number of end-of-life packs and cells, and recover valuable materials there from), there remains significant challenges to the initial separation of composite electrodes in order to recover re-usable components therefrom in a cost-effective and environmentally friendly manner.

SUMMARY OF THE DISCLOSURE

A method of recycling lithium-ion batteries is provided. The method is useful for recovering re-usable components, in particular components of composite electrodes, from spent lithium-ion batteries. Specifically, the method comprises isolating from a spent lithium-ion battery a composite electrode comprising an electrode material adhered to a current collector with a polyvinylidene difluoride (PVDF) binder. The method also comprises contacting the composite electrode with a polyol fluid capable of releasing the PVDF binder from the current collector, thereby forming a mixture. The method further comprises delaminating the electrode material from the current collector to give a free electrode material and a free current collector, and recovering each of the free electrode material and the free current collector from the mixture.

The method provides a highly efficient, cost-effective, and environmentally sustainable separation process that enables direct recycling of lithium-ion batteries. In some embodiments, the composite electrode is disposed in the polyol fluid to affect the delamination. In some embodiments, particular polyol fluids, such as ethylene glycol, are used to delaminate electrode materials at low temperatures in mere seconds, without altering the crystalline structure and morphology of the active electrode materials involved. In some embodiments, the recovered free current collectors are intact and any corrosion. In some embodiments, the polyol fluid can be continuously reused, such as in a continuous-reactor type separation process, enabling a closed-loop ecosystem and lithium-ion battery circular economy.

These and other features and advantages of the present invention will become apparent from the following description of the invention, when viewed in accordance with the accompanying examples and the appended claims.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION

Figure 1:
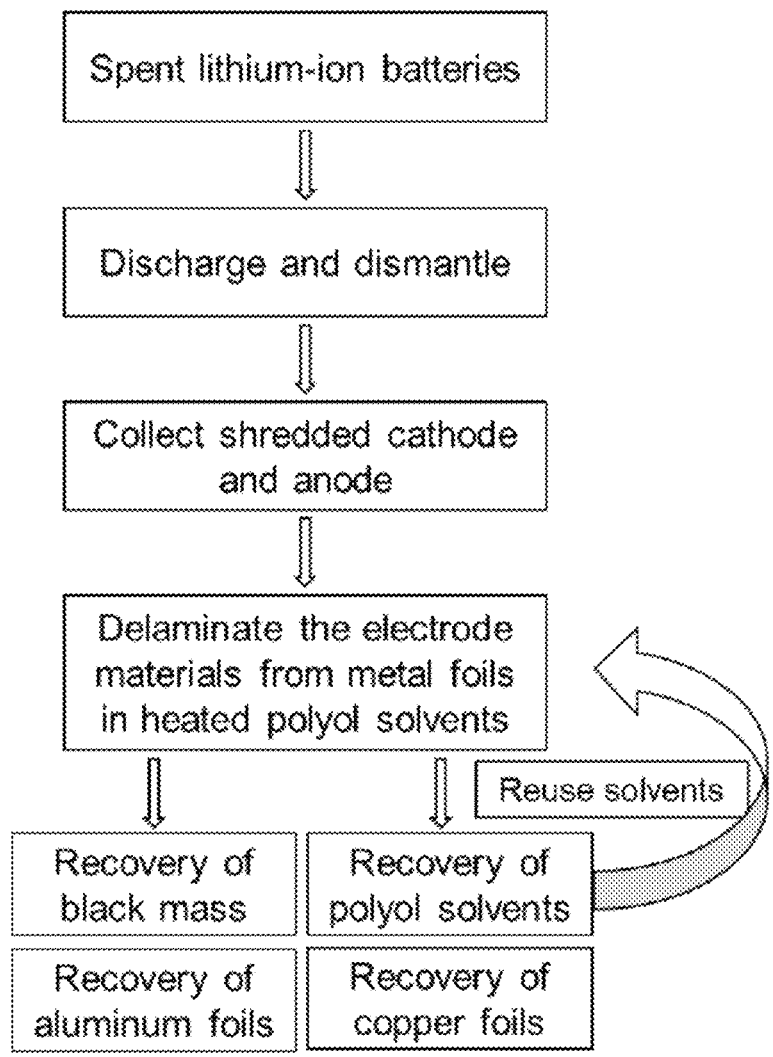
FIG. 1 provides a flow chart showing one embodiment of a recycling method, including an ethylene glycol (EG)-based separation process for recovering black mass and metal foils from spent lithium-ion batteries.

A method of recycling lithium-ion batteries is provided. As described herein, the method provides a direct recycling process, and thus may be used to recover certain components of lithium-ion batteries with intact chemical structures. The recovered components may then be reused, e.g. by preparing new components and/or new batteries therewith, thus driving down the overall production cost of preparing new batteries. As described below, the method enables a higher recovery of materials with reduced energy requirements and an increased safety profile, and thus also provides a unique strategy to enable economic recovery of more materials with less energy consumption compared to conventional recycling methods.

In general, the method comprises separating electrode material from current collectors in isolated composite electrodes. As understood by those of skill in the art, a primary challenge for enabling direct recycling is separating electrode materials or black mass from the current collectors in a manner that is efficient, economical, and results in minimal or no changes to the chemical structure (e.g. morphology, composition, etc.) of both the electrode material (e.g. black mass) and the current collectors. The high stability and strong bonding capability of the organic binders utilized in typical lithium-ion batteries make it difficult to separate the electrode materials from the current collectors. As such, conventional processes for separating these components exhibit high energy consumption, low peeling-off efficiency, and produce numerous byproducts that increase environmental pollution loads. Comparatively, as described in the exemplary embodiments and demonstrated in the example herein, the method provided here possess a high peeling-off efficiency, uses cost-effective materials and techniques, and is both energy efficient and environmentally friendly.

With more particularity, the method typically comprises: isolating a composite electrode from a spent lithium-ion battery, with the composite electrode comprising an electrode material adhered to a current collector with a polyvinylidene difluoride (PVDF) binder; contacting the composite electrode with a polyol fluid capable of releasing the PVDF binder from the current collector, thereby forming a mixture; delaminating the electrode material from the current collector to give a free electrode material and a free current collector; and recovering each of the free electrode material and the free current collector from the mixture. The particular details and salient parameters of these processes, techniques, and features of the method are described in detail below.

As will be appreciated in view of the description and examples herein, the scope of lithium-ion batteries suitable for use in the method is not especially limited, and particular such batteries will be selected by one of skill in the art in view of the particular embodiments exemplified herein, limited only by the requirements of certain components and/or composition features (e.g. such as the inclusion of a composite electrode suitable for use in the method processes described below). In general, lithium-ion batteries comprise common components, which typically include a shell or case (or "shell casing"), electrodes for storing lithium ions (e.g. a cathode electrode and an anode electrode) disposed within the shell, a separator disposed between the electrodes, and an organic electrolyte suitable for carrying the lithium ions between the electrodes through the separator. The lithium-ion batteries may be manufactured as or otherwise utilized in any particular form or type of battery, such as a coin cell (e.g. CR2032), a pouch cell, a cylindrical cell, or a combination thereof. For example, a plurality of lithium-ion batteries may be arranged in the form of a battery pack.

Regarding the battery components, the shell may include or be formed from any material known in the art for lithium-ion batteries. Typically, the shell comprises, alternatively is, a plastic material, a metal-containing material, or a combination thereof. In some embodiments, exemplary shells typically consist essentially of a single material component and are substantially homogeneous in composition. Examples of such materials include stainless steels, nickel-plated steels, and plastic-metal composites (e.g. aluminum-plastic compositions, laminates, etc.).

The separator of suitable lithium-ion batteries is not particularly limited, as will be understood in view of the description below. As such, any separator suitable for use in a lithium-ion battery can theoretically be utilized, with particular separators being selectable for use in view of the other battery components by one of skill in the art (e.g. to provide a low resistance against ion migration of the electrolyte, excellent electrolyte solution-wetting ability, etc.). General examples of such materials are selected from glass fiber, polyester, Teflon, polyolefins (e.g. polyethylene (PE), polypropylene (PP), polytetrafluoroethylene (PTFE), etc.), and various combinations thereof, and may be utilized in a form of a nonwoven or woven fabric. Specific examples of separators typically include porous membranes comprising PE, PP, or PE/PP copolymers, which are generally unreactive with organic solvents and thus suitable for safe use with the other battery components.

The electrolyte is also not particularly limited in terms of the method, and thus suitable lithium-ion batteries may generally comprise any electrolyte solution or composition suitable for use in a lithium-ion battery. General examples of such electrolyte compositions generally include various liquid electrolytes and solid electrolytes. Example of liquid electrolytes typically include electrolyte salts (e.g. lithium salts, such as $LiPF_6$, $LiBF_4$, $LiCF_3SO_3$, $Li(SO_2CF_3)_2$, $LiClO_4$, etc.) in an organic solvent (e.g. alkyl carbonates, such as ethylene carbonate, dimethyl carbonate, diethyl carbonate, etc.).

The electrodes of lithium-ion batteries suitable for the method typically comprise an electrode material adhered to a current collector with an organic binder. The particular electrode material and current collector will be selected based on the use of the particular electrode. i.e., as a cathode electrode ("cathode") or an anode electrode ("anode") in the battery utilized.

In some embodiments, the composite electrode is further defined as a composite cathode. In such embodiments, the electrode material is further defined as a cathode active material. It will be appreciated that, as a component of the lithium-ion battery being recycled, the cathode active material typically comprises a lithium-bearing metal oxide. Examples of such compounds include $LiCoO_2$, $LiMn_2O_4$, $LiNiO_2$, $LiCrO_2$, $LiFePO_4$, $LiNiO_2$, $LiMn_2O_4$, $LiV_2O_5$, $LiTiS_2$, $LiMoS_2$, $LiMnO_2$, as well as variations of lithium nickel oxides, lithium nickel manganese oxides, lithium nickel manganese cobalt oxides, and the like, exemplified by those having general formulas such as $LiNi_xMn_yO_2$, $Li_{1+z}Ni_xMn_yCo_{1-x-y}O_2$, $LiNi_xCo_yAl_zO_2$, $LiNi_xCo_yMn_zO_2$, etc., where each x, y, and z is typically a mole fraction of from 0 to 1, where x+y+z=1. Such materials are known in the art, and will be readily selected by those of skill in the art. The cathode active material may also comprise a conductive agent, e.g. for enhancing the electron conductivity of the cathode active material.

In some embodiments, the composite electrode is further defined as a composite anode. In such embodiments, the electrode material is further defined as an anode active material. Typically, the anode active material comprises an electroconductive carbon compound. Examples of such compounds, which are also known as carbonaceous conductive materials, typically include graphene, graphite, and other various forms of carbon, such as paracrystalline carbon (e.g. carbon black). However, any suitable anode active material may be utilized, and will typically be selected on a basis of low cost, high coulombic efficiency, and high capacity. The anode active material may also comprise a conductive agent, e.g. for enhancing the electron conductivity of the cathode active material. In some embodiments, the anode active material comprises graphite and/or carbon black.

In general, the electrode material of each comprises a binder, such as an organic binder, i.e., to adhere together the active components thereof (e.g. the conductive materials, conductive agents, etc.), as well as to adhere the electrode material to the adjacent current collector. In the present embodiments, the organic binder is typically a polyvinylidene fluoride (PVDF)-based binder ("PVDF binder"), as will be best understood in view of the entire description and the examples herein. Examples of such PVDF binders generally include, either as a homopolymeric composition, as a copolymer or interpolymer of PVDF and one or more other monomers, or a multi-polymer composition comprising a PVDF homo- or copolymer with one or more other polymers. Such PVDF binders are known in the art, and will be readily selected by those of skill in the art in consideration of preparing the electrode materials and composite electrodes described herein. Examples of particular PVDF binders may comprise various combinations of comprise combinations of polyvinylidene fluorides, polytetrafluoroethylenes, fluorinated ethylene-propylene copolymers (e.g. from tetrafluoroethylene and/or hexafluoropropylene, etc.), and various per- or polyfluoroalkoxy polymers. One of skill in the art will appreciate that, while PVDF is exemplified herein, other similar binders to those above, even some that are substantially free from, alternatively are free from PVDF, may also work as intended when utilized in the method.

The current collectors of suitable lithium-ion batteries are not particularly limited, as will be understood in view of the description below. In general, any current collector suitable for use in a lithium-ion batteries can theoretically be utilized, with particular current collector being selectable for use in view of the other battery components (i.e., the other electrode components, such as the binder and active materials thereof) by one of skill in the art. Examples suitable current collectors generally include materials comprising, alternatively consisting essentially of, aluminum, copper, nickel, titanium, stainless steel, and even some carbonaceous materials. The current collector may be in any form known in the art, such as plates, sheets, foils, etc. Such terms may be overlapping in scope, as the current collector may have any thickness that is suitable for carrying a current, but will typically be selected with a minimal thickness to in order to maximize energy density. Other materials and structures, as well as specific treatments (e.g. etching, coating, etc.) may be utilized to enhance the electrochemical stability and electrical conductivity of current collectors; however, it will be appreciated that not all composite current collectors may be suitable for use in the method in all circumstances, as the conditions and materials may be optimized for homogeneous metallic current collectors.

The current collector for cathode and anode electrodes will be independently selected. In certain embodiments, the lithium-ion battery comprises a cathode having an aluminum current collector. In specific embodiments, the cathode current collector is an aluminum sheet or foil. In these or other embodiments, the lithium-ion battery comprises an anode having a copper current conductor. In specific embodiments, the anode current collector is a copper sheet or foil.

As introduced above, the method comprises isolating the composite electrode from a spent lithium-ion battery. Typically, the method discharging the lithium-ion battery before further processing, i.e., to remove any remaining charge stored therein. In this fashion, the term "spent" is used herein to refer to a discharged battery, and is not necessarily limited to an end-of-life or fully discharged battery.

Techniques for discharging are not limited, and are exemplified by soaking the battery in an aqueous solution (e.g. neutral or alkaline) containing a conducting salt (e.g. $NaHCO_3$, $KHCO_3$, $Na_2CO_3$, $K_2CO_3$, $CaCO_3$, $MgCO_3$, NaOH, KOH, $Ca(OH)_2$, $Mg(OH)_2$, NaCl, $CaCl_2$, and the like, or combinations thereof). In some embodiments, the shell of the battery may be punctured (e.g. via piercing, cutting, etc.) before soaking in the aqueous solution for discharge.

Once the battery is discharged, isolating the composite electrode generally includes dismantling the battery and separating the composite electrode from the other battery components, such as the shell, electrolyte, separator, etc. The isolation process is not limited, and may be carried out in various fashions with any technique meeting the limitations of the embodiments described herein. For example, isolation techniques will typically be selected in view of the direct recycling aim to not damage, destroy, or otherwise render the composite electrode less usable than in the native state prior to isolation.

In certain embodiments, the spent lithium-ion battery is chopped, cut, or shredded into smaller pieces (e.g. via manually or computer-monitored saw/blade cutting, waterjet cutting, etc.). The pieces may be sized for homogeneity, increased surface area, processing capabilities of the particular equipment utilized, etc.

In some embodiments, the method further comprises washing the composite electrode. In such embodiments, the composite electrode is typically washed with an organic solvent that is unreactive with the composite electrode and also capable of removing any residual amount of electrolyte or particular matter from the composite electrode prior to combining the composite electrode with the polyol fluid as described below.

As introduced above, the method comprises contacting the composite electrode (e.g. once isolated) with a polyol fluid. The particular benefits, effects, and parameters for selecting the polyol fluid will be best understood in view of the examples and experimental results herein. In general, however, the polyol fluid is selected based on a capability to release the PVDF binder from the current collector, thereby facilitating separation/delamination of the electrode material from the current collector. Moreover, in particular embodiments, the polyol fluid is selected to also be incapable of dissolving the PVDF binder (i.e., while still affecting release from the current collector), which is a feature of the method that supports use in direct recycling of the lithium-ion batteries described herein. Typically, the polyol fluid is inert under the method conditions, such that the polyol fluid remains substantially unchanged/unreacted throughout the method.

The polyol fluid is exemplified by glycols and glycerols. In some embodiments, for examples, the polyol fluid comprises, alternatively is, a glycerol, a glycol, or a combination thereof. In certain embodiments, the polyol fluid comprises, alternatively is an alkylene glycol. In specific embodiments, the polyol fluid comprises, alternatively is ethylene glycol. For purposes of illustrating the unique processes and effects of the method, ethylene glycol is exemplified in many of the embodiments and examples herein. However, it is to be appreciated that other polyol fluids meeting the limitations and requirements described herein may also be utilized in or as the polyol fluid, optionally in addition to or in place of ethylene glycol where described.

Any amount of the polyol fluid may be utilized, and the contact between the composite electrode and the polyol fluid is not directionally limited (i.e., either substance may be placed in contact with the other). In general, once combined, a mixture (e.g. a heterogeneous mixture) of the composite electrode and the polyol fluid is formed. In some embodiments, contacting the composite electrode (e.g. once isolated) with the polyol fluid comprises disposing the composite electrode (e.g. once isolated) in the polyol fluid to prepare a mixture. In such embodiments, the composite electrode and the polyol fluid can be combined in any amounts and/or ratios, which will be selected by those of skill in the art, e.g. based on the size of the separation being carried out, the amount of one component to be utilized, etc. For example, in these or other embodiments, the mixture comprises a solid-to-liquid ratio of about 1:10 wt./wt., based on the weights of the composite electrode and the polyol fluid. However, ranges around this ratio may also be utilized, such as those in the range of from 1:20 to 1:1, alternatively 1:15 to 1:5. However, it will be appreciated that the polyol fluid is typically utilized in excess, especially in embodiments where the polyol fluid is captured for reuse as described below.

In some embodiments, the polyol fluid is heated to an elevated temperature prior to contacting the composite electrode. For example, in some embodiments, the polyol fluid is heated to a temperature of from greater than room temperature to the boiling point of the polyol fluid 198° C. In specific embodiments, the method comprises heating the polyol fluid to a temperature of from 20 to 198° C., such as from 100 to 198° C., alternatively from 160 to 198° C. In such embodiments, the temperature of the polyol fluid may impact the effectiveness and/or rate at which the PVDF binder present in the electrode material is released from the current collector, as described in further detail below.

In general, the polyol fluids exemplified herein are capable of releasing the PVDF binder present in the electrode material from the current collector within a few hours of forming the mixture at room temperature. However, it will be understood that the particular rate of release will be dependent on the particular conditions and materials utilized, as demonstrated in the examples. For example, in certain embodiments, the polyol fluid is capable of releasing the PVDF binder from the current collector within ~2 hours of forming the mixture at room temperature, within ~2 minutes of forming the mixture at a temperature of at least 100° C., and within ~2 seconds of forming the mixture at a temperature of at least 198° C. It will be appreciated that such time frames may apply equally to the delamination rates of the method, as the delamination may be carried out sequentially or concurrently with the release. In some embodiments, the composite electrode is disposed in the polyol fluid at reflux.

As introduced above, the method comprises delaminating the composite electrode, i.e., be separating/delaminating the electrode material and the current collector from one another to give a free electrode material and a free current collector. The delaminating may be carried out by any means suitable for separating the electrode material and the current collector from one another, as will be understood from the further description herein. In general, once the mixture has been formed (i.e., once the composite electrode is contacted with the polyol fluid), delaminating the composite electrode simply requires mechanically separating the electrode material and the current collector from one another. As such, specific techniques such as peeling, or more general processes such as agitation (e.g. via stirring, shaking, tumbling, sonication, vortexing, etc.) may be utilized.

In some embodiments, delaminating the electrode material from the current collector comprises peeling a film of the electrode material from the current collector. As demonstrated in the examples herein, the method is highly effective, and in typical cases may exhibit a peel-off efficiency of greater than 95, alternatively greater than 98, alternatively greater than 99%. In other embodiments, delaminating the electrode material from the current collector comprises mechanically agitating the mixture, e.g. with a stirrer, stir bar, etc.

Once delaminated, the components of the method are typically isolated or otherwise separated from each other. In particular, the free electrode material and the free current collector are recovered from the heterogeneous mixture comprising the polyol fluid, which may also be captured as described below.

In some embodiments, the method comprises filtering the mixture to extract at least one of the free electrode material and the free current collector. For example, in some such embodiments, the method comprises sizing the free electrode material (e.g. by chopping, grinding, etc.). In such embodiments, the mixture may be screened with selective filtering (e.g. via size-selection filtration), i.e., to remove and isolate the free current collector but not the sized free electrode material therefrom. In such embodiments, another filter may be used to remove and isolate the free electrode material from the mixture.

In some embodiments, the method comprises rinsing the free electrode material and/or the free current collector with a solvent (e.g. ethylene carbonate, etc.) to remove a residual amount of the polyol fluid therefrom.

In some embodiments, the method comprises recycling the polyol fluid, which may be used in subsequent delamination events. For example, in certain embodiments the method comprises collecting the polyol fluid (e.g. after recovering the free electrode material and the free current collector), and then reusing the polyol fluid (e.g. in another round of the method) to delaminate another composite electrode. In some such embodiments, the method also includes purifying the polyol fluid between delaminations, e.g. via filtration or distillation, with the latter being particularly suitable for use with the refluxing conditions mentioned above. In such instances, a reflux condenser may be fitted to the reactor/vessel in which the delamination process of the method is carried out.

As introduced above, the method may be utilized in direct recycling, such that the components recovered from the battery may be reused. For example, in some embodiments, the free electrode material recovered from the mixture comprises substantially the same morphology as the initial electrode material. In these or other embodiments, the free electrode material recovered from the mixture comprises substantially the same chemical composition as the initial electrode material. In these or other embodiments, the free electrode material recovered from the mixture comprises substantially the same electrochemical performance as the initial electrode material. In some embodiments the free electrode material recovered from the mixture is directly reusable in the preparation of a new composite electrode, as described further below. However, it will be appreciated that the free electrode material may also be processed in numerous ways prior to such use or any final application.

In some embodiments, the free current collector recovered from the mixture is substantially free from corrosion. In these or other embodiments, the free current collector recovered from the mixture is substantially free from residual electrode material.

In some embodiments, the method further comprises preparing a new composite electrode using the free electrode material. In some such embodiments, the method further comprises preparing a new lithium-ion battery using the new composite electrode. In this fashion, the composite electrode may be reused, and thus that component of the battery recycled, once recovered. Similarly, in certain embodiments, the free current collector is reused to prepare a new composite electrode and/or a new battery.

The following examples, illustrating embodiments of this disclosure, are intended to illustrate and not to limit the invention. Unless otherwise noted, all reactions are carried out under air, and all materials, substrates, and reagents are purchased or otherwise obtained from various commercial suppliers and utilized as received. The solvents utilized in the examples, including dimethyl carbonate, ethylene glycol (EG), glycerol, and diethylene glycol (DEG), were purchased from Sigma-Aldrich and used without any treatment.

EXAMPLES

Materials and Cell Assembly

A $LiNi_{0.5}Mn_{0.3}Co_{0.2}O_2$ (NMC532) cathode and graphite anode were fabricated using a pilot-scale slot-die coater (Frontier Industrial Technology). The cathode consisted of NMC532 (Toda America), carbon black (Denka), and PVDF binder (Solvay Solef 5130) in a weight ratio of 90:5:5. The areal loading of the NMC532 cathode was ~11.5 mg/cm$^2$.

Figure 10:
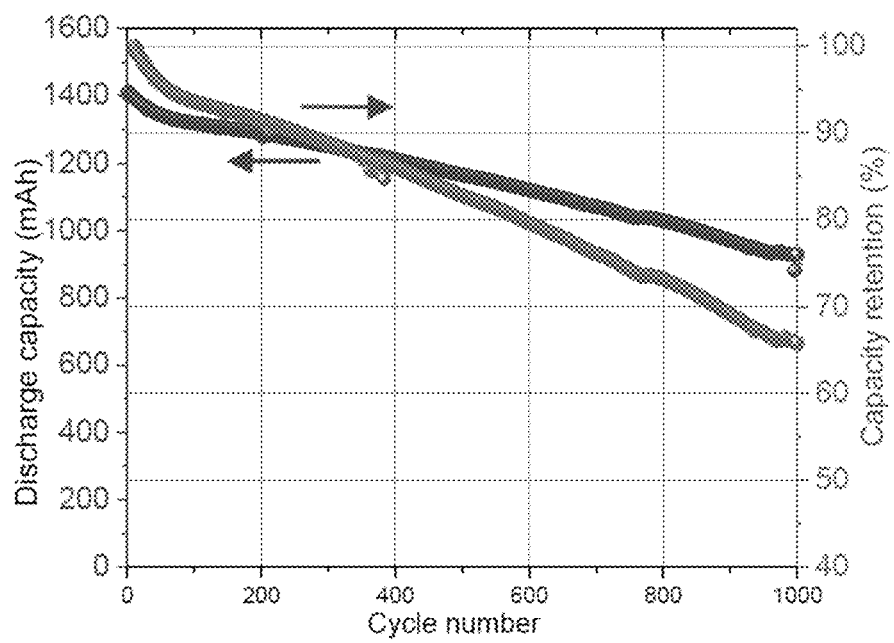
FIG. 10 provides a graph showing the electrochemical history of a fabricated pouch cell consisting of NMC532 cathode and graphite anode, which was charged/discharged at 1 C/2 C rates.

A 1.4 Ah lithium-ion pouch cell (~6×8 cm$^2$) was then assembled in a dry room. After 4 formation cycles at C/20, the pouch cell was charged/discharged at 1 C/2 C rates for 1,000 cycles and the capacity degraded to 65.7% of its initial capacity. A graph of the electrochemical history of the fabricated pouch cell is shown in FIG. 10.

Cathode scraps were prepared from trimmings of a fabricated $LiNi_{0.6}Mn_{0.2}Co_{0.2}O_2$ (NMC622, Targray) cathode.

Characterizations & Analytical Instrumentation

The crystal structure, surface morphology, and composition of the cathode materials before and after separation, as well as the recovered aluminum foils, were all characterized by x-ray diffraction (XRD; PANalytical X'pert PRO) and scanning electron microscopy (SEM; Zeiss MERLIN) with energy-dispersive x-ray spectroscopy (EDX). Fourier-transform infrared (FTIR) spectroscopy (Bruker) was used to analyze the cathode material as well as EG before and after use. The lithium content of the NMC622 cathode materials before and after delamination was measured by using an inductively coupled plasma optical emission spectrometer (ICP-OES, Agilent Technologies 5110).

General Procedure

Figure 2A:
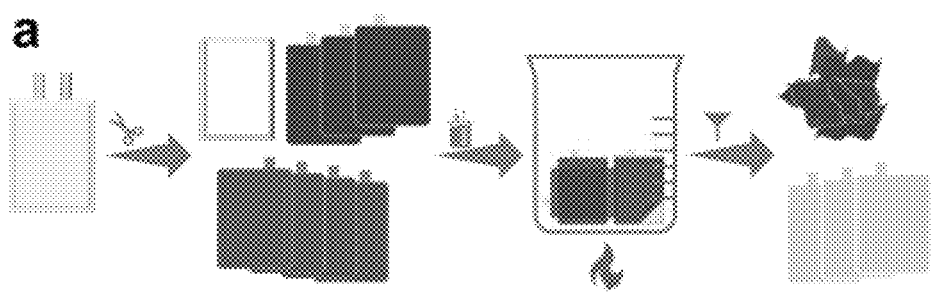
FIG. 2A provides a Schematic showing the EG-based separation process.
Figure 2B:
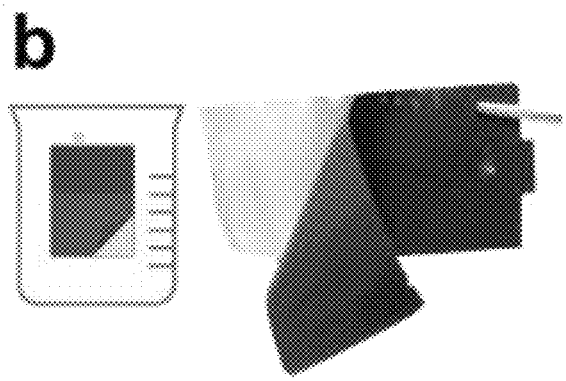
FIG. 2B provides a digital images showing a partially delaminated NMC532 cathode.

A general procedure for the EG-based separation process in the examples is illustrated via flow chart in FIG. 1, and graphically in FIG. 2B. In particular, the spent lithium-ion pouch cell was discharged and manually dismantled by separating the pouch, separator, cathode electrode, and anode electrode. The electrodes were washed with dimethyl carbonate to remove the electrolyte. The spent cathode and cathode scraps were cut into pieces and placed into a flask containing heated EG, with a typical solid:liquid ratio of 1:10 (wt./wt.). After being held at a stable temperature (typically 160° C.) for a time under stirring, the mixture was allowed to cool down to room temperature. Cathode materials delaminated from the aluminum foil within several seconds. The cathode films and the aluminum foils were then separated manually or through screen filtration after breaking down the cathode films to small pieces. The subsequent filtration separated the cathode materials from the solvent, which were recovered independently. Both the aluminum foils and the delaminated cathode materials were rinsed with alcohol (e.g. ethanol, isopropanol) to remove residual EG, and the recovered cathode films and aluminum foils were washed, dried, and characterized.

Assessments & Observations

Figure 2C:
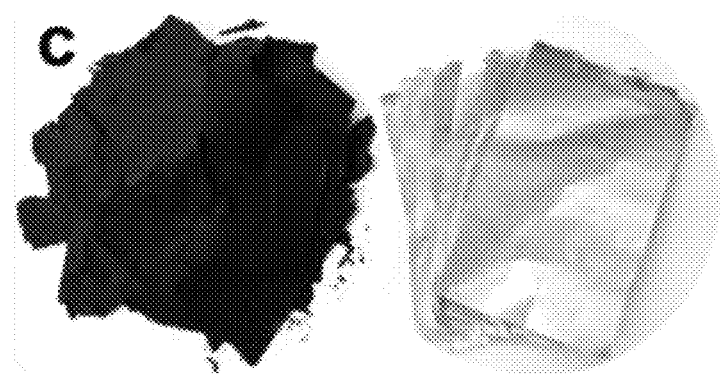
FIG. 2C provides a recovered NMC532 cathode materials and aluminum foils.

After contact with the PG, the cathode material was peeled off from the aluminum foil as a self-supported electrode, presumably due to the PG-mediated disruption of the cohesive bonding of the PVDF binder that holds the NMC particles and carbon black together. Digital images of the self-supported electrode (FIG. 2B), as well as the recovered cathode materials and aluminum foils (FIG. 2C). The recovered aluminum foil exhibited a shiny glare, with no observable surface corrosion.

Electrodes of different sizes were subjected to the EG-based separation process according to the general procedure above. Each electrode delaminated completely in a few seconds. As such, it is believed that the EG-based separation process is robust and without particular limitation or requirement as to the size of the electrode being processed, and thus uniquely suited for ubiquitous recycling batteries of limited formats and sizes (e.g. those of EVs). Specifically, this size-independency may be employed without needing to shred the spent batteries/components into small pieces, which may introduce impurities or otherwise complicate the separation/recovery processes.

Figure 3A:
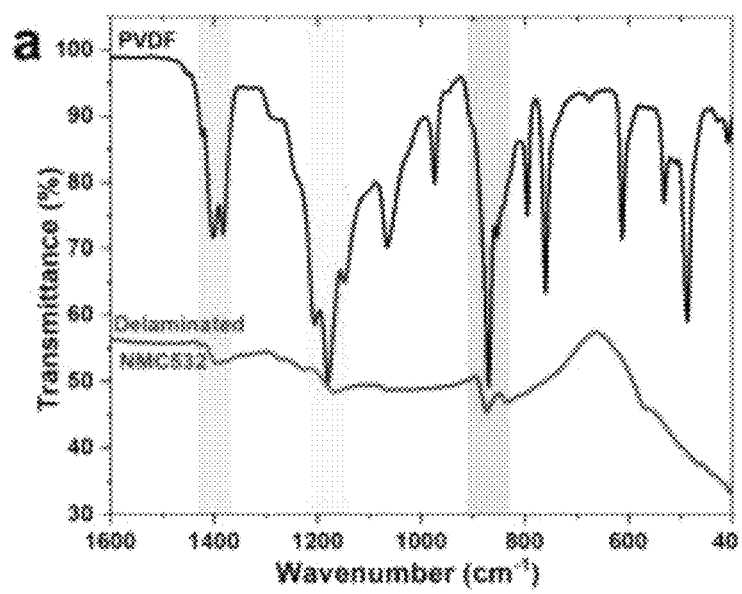
FIG. 3A provides an FTIR spectra for the pristine polyvinylidene difluoride (PVDF) binder (top) and the delaminated cathode of NMC532 (bottom) from the EG-based separation process; and (b) XRD patterns for spent NMC532 cathode materials (bottom) before and (top) after the EG-based separation process.
Figure 3B:
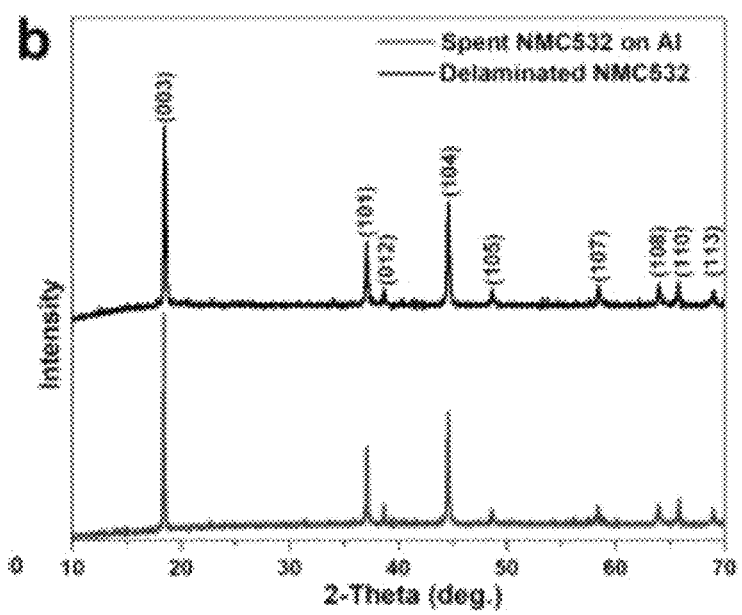
FIG. 3B provides XRD patterns for spent NMC532 cathode materials (bottom) before and (top) after the EG-based separation process.

The delaminated electrode was assed via FTIR and XRD, the spectra of which are shown in FIGS. 3A and 3B, respectively. The presence of PVDF binder in the delaminated electrode was confirmed by FTIR. The fingerprint of pristine PVDF including the characteristic peaks at 1,399, 1,180, and 870 cm$^{-1}$, which are ascribed to the bending vibration of $CH_2$, symmetrical stretching of $CF_2$, and out-of-plane bending vibration of $CH_2$, respectively, can be clearly distinguished in the delaminated electrode. All peaks in the XRD patterns can be indexed to the r3m space group with the layered rhombohedral structure of $\alpha$-$NaFeO_2$. The diffraction peaks of NMC532, both before and after delamination, were consistent, indicating that the crystal structure of the active material was well-maintained and without impurities detected after separation. As such, it is believed that the EG-based separation process is particularly suitable for employment in direct cathode recycling.

Preserving the morphology of active materials during separation is critical to facilitating the direct regeneration of cathode materials for new battery manufacturing.

Figure 4:
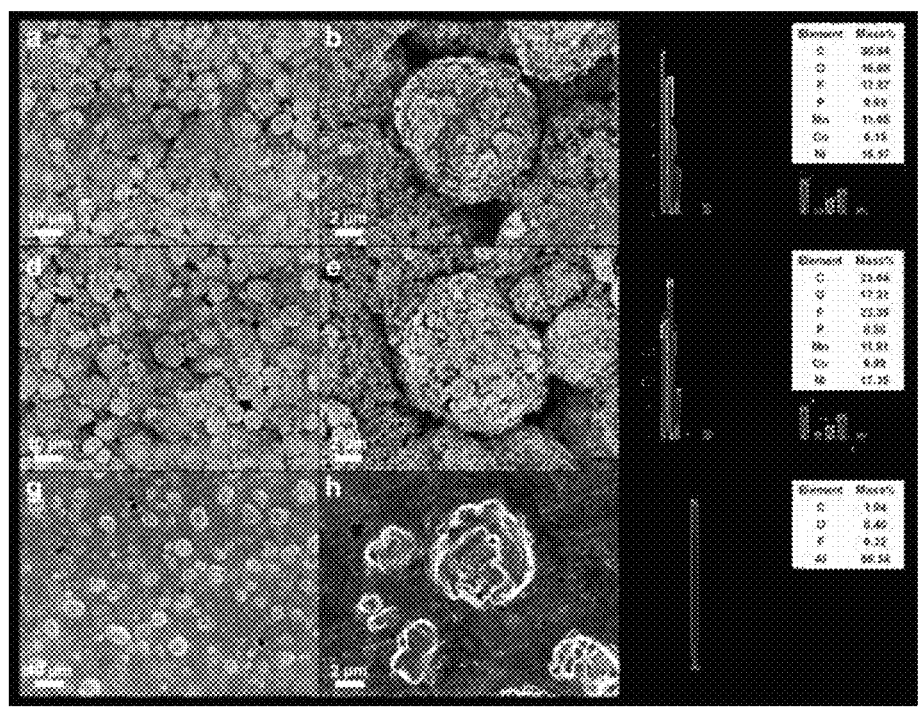
FIG. 4 provides SEM images showing morphology of the spent NMC532 cathode (a, b) before and (d, e) after the EG-based separation process, and (g, h) the surface morphology of the recovered aluminum foil; and EDX spectra for the NMC532 cathode (c) before and (f) after delamination, and (i) for the recovered aluminum surface.

The EG-based separation process is demonstrated to be nondestructive to the morphology of active materials. SEM images are provided in FIG. 4, showing morphology of the spent NMC532 cathode (a, b) before and (d, e) after the EG-based separation process. As shown, the morphologies of the electrode before and after separation were quite similar, each being composed of microparticles of NMC532 and carbon black bonded via the polymeric binder PVDF.

The electrode surface composition was analyzed by EDX, with the resulting spectra for both the NMC532 cathode (c) before and (f) after delamination, and for (i) the recovered aluminum surface, also shown in FIG. 4. As shown, the surface composition was consistent before and after separation, with the ratio between different transition metals (e.g. Ni, Mn, and Co) being well-preserved after delamination. In addition, the existence of F peak in the EDX spectra after separation further demonstrates that the EG-based separation does not remove PVDF binder from the cathode particles. Accordingly, it is believed that the EG-based separation process is particularly suitable for implementation with direct cathode recycling, as preserving the morphology of active materials during separation is critical to facilitating the direct regeneration of cathode materials for new battery manufacturing.

As stated above, and as confirmed by FTIR and EDX spectra, the PVDF binder was not removed or dissolved during the EG-based separation process, which is believed to be explainable via the Hansen solubility parameters (HSP), which are used for predicting the ability for a solvent to solubilize PVDF. In particular, the HSP distance, denoted as Ra, represents the distance between PVDF and the solvent in a three-dimensional Hansen space. The lower the Ra value, the higher chance that PVDF can be dissolved in that solvent. HSP and calculated Ra values for comparative solvents NMP and DMF and are provided alongside the values for EG in Table 1 below.

TABLE 1

Hansen Solubility Parameters of Solvents Li-Ion Batter Recycling Processes

| Compound | $\delta_d$ (MPa)$^{1/2}$ | $\delta_p$ (MPa)$^{1/2}$ | $\delta_h$ (MPa)$^{1/2}$ | $R_a$ (MPa)$^{1/2}$ |
|---|---|---|---|---|
| PVDF | 17.2 | 12.5 | 9.2 | — |
| NMP | 18.4 | 12.3 | 7.2 | 2.3 |
| DMF | 17.4 | 13.7 | 11.3 | 2.4 |
| EG | 17.0 | 11.0 | 26.0 | 16.9 |

As shown, both NMP and DMF solvents have small Ra values of 2.3 and 2.4 (MPa)$^{1/2}$, respectively, suggesting good solubility of PVDF in NMP and DMF solvents. The latter have been widely used to solubilize PVDF for the cathode slurry and membrane preparation. In contrast, EG has a high Ra value of 16.9 (MPa)$^{1/2}$, emphasizing the lower ability of PVDF dissolution in EG. The findings are in good agreement with the experimental observations obtained from the FTIR and EDX spectra.

Aluminum foils are known to be reactive and easily subject to corrosion during separation, causing contamination on the active materials and thus introducing complicated separation processes and severely restricting the solvents and conditions that may be employed in recycling processes. As shown in FIGS. 3A and 3B, and FIGS. 11A-11D, the EG-based process fully recovered aluminum foils with shiny surfaces, suggesting that no corrosion occurred and that no residue of electrode material was left on the surface of the foil. This observation was confirmed via XRD of the recovered aluminum foil, which, as shown in the spectra provided in FIG. 12, provided a pattern where all diffraction peaks can be attributed to aluminum. Additionally, with further reference to the SEM images (g, h) and EDX spectra (i) of FIG. 4 introduced above, the surface of the recovered foil was clean, showing micro-dents imprinted from NMC532 microparticles (i.e., observed via SEM), and being free from transition metals (e.g. via EDX analysis). Accordingly, it is believed that the EG-based separation process provides for efficient and effective recovery of reusable aluminum. Notably, copper and aluminum have been reported as the key contributors to emissions of SOx and NOx in the cradle-to-gate stages of the battery life cycle, and it has been suggested that using all recycled aluminum can reduce total energy consumption during electric vehicle production by ~33%.

Figure 5:
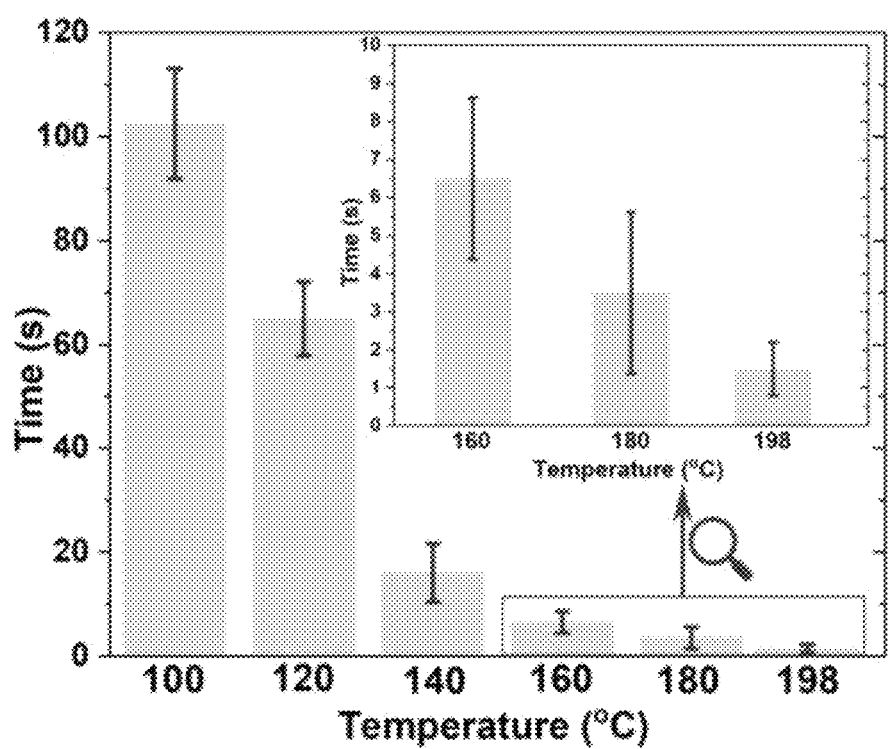
FIG. 5 provides a graph showing the effect of temperature on the time needed for complete delamination during the EG-based separation process.

The delamination process is operable over a very broad range of temperatures (i.e., from room temperature (~20° C., rt) to the boiling point of EG (~498° C.)) and times (e.g. from 2 s to 2 hours). Delamination is complete after a couple hours at room temperature, and sooner at elevated temperatures. To assess particular temperatures and rates, the general procedure above was performed at various temperatures and the delamination times recorded in the graph shown in FIG. 5. Surprisingly, as shown, the delamination was completed on a time scale of less than 2 minutes when a temperature of at least 100° C. was employed, and even more rapidly when the temperature was increased further. Notably, a complete detachment/delamination can be observed in about 6 s at 160° C., and in about only 2 s at the boiling point of EG. It is believed that these time scales represent the most rapidly-occurring process for completely peeling a cathode material from a current collector to which it's bound.

Figure 13A:
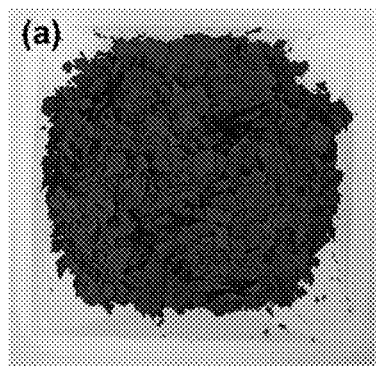
FIG. 13A provides a digital image showing a recovered NMC622 cathode material in large scale.
Figure 13B:
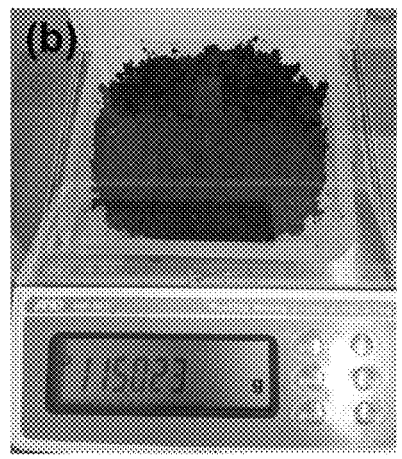
FIG. 13B provides another digital image showing a recovered NMC622 cathode material in large scale.
Figure 13C:
FIG. 13C provides a digital image showing a recovered aluminum foil from NMC622 cathode scraps.
Figure 14A:
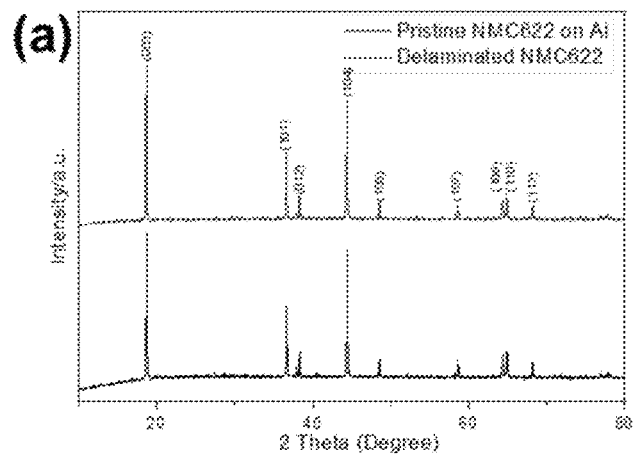
FIG. 14A provides XRD patterns for the NMC622 cathode before (bottom) and after (top) the delamination process in EG for a NMC622 cathode.
Figure 14B:
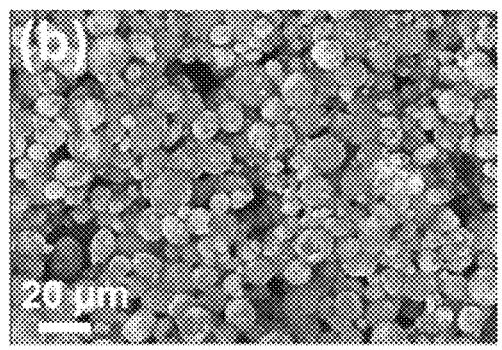
FIG. 14B provides an SEM image for the NMC622 cathode before the delamination process in EG.
Figure 14C:
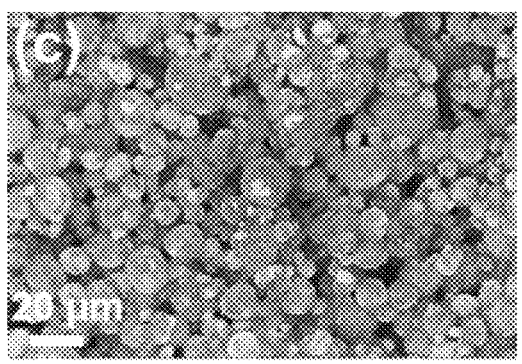
FIG. 14C provides an SEM image for the NMC622 cathode after the delamination process in EG.

To assess the general applicability of the method, the NMC622 electrode "scraps" prepared as previously described were utilized in the general procedure above in a direct recycling process. The NMC622 electrode trimmings were rapidly and completely delaminated and the component parts, shown in FIGS. 11B and 11D, were easily recovered. This same process was also repeated at scale to recover ~115 g of electrode material from the cathode scraps, as well as clean aluminum foil, as illustrated by the images provided in FIGS. 13A-13C. Notably, both the crystalline structure and the morphology of the recovered NMC622 particles were well-maintained after the separation process, as shown by the XRD pattern (FIG. 13A) and SEM images taken before (FIG. 13B) and after (FIG. 13C) delamination, further emphasizing the benign conditions concerning the materials involved.

Figure 6:
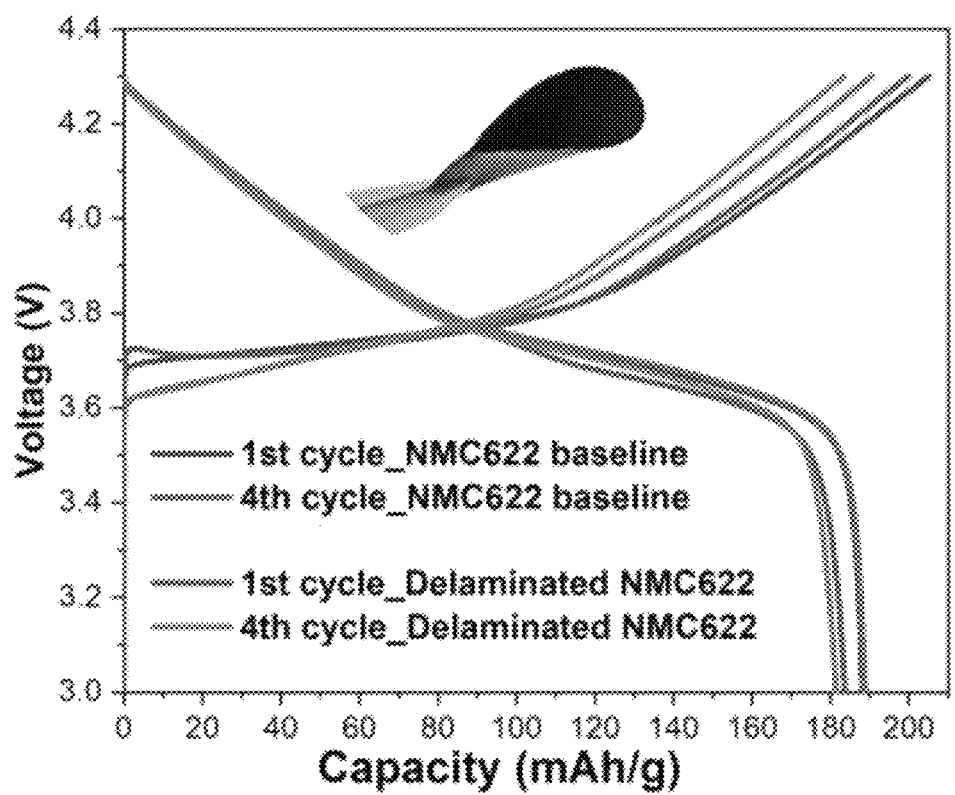
FIG. 6 provides charge-discharge profiles of the NMC622 electrodes before and after delamination at C/10 charge/discharge rates tested in half cells, with the freestanding electrode used for coin cell assembly shown as in insert.
Figure 11A:
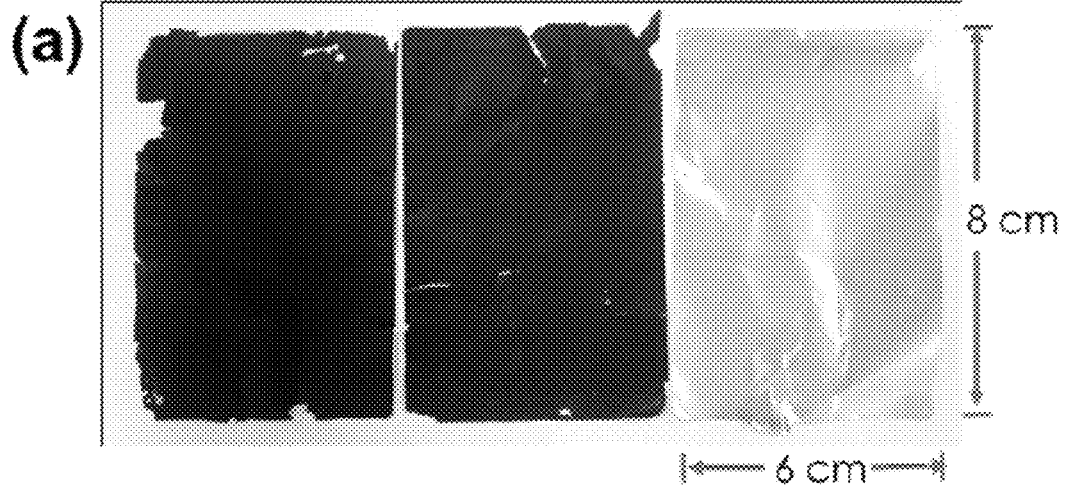
FIG. 11A provides a digital image showing recovered cathode materials and a recovered aluminum foil from spent NMC532 cathode with 6×8 cm scale.
Figure 11B:
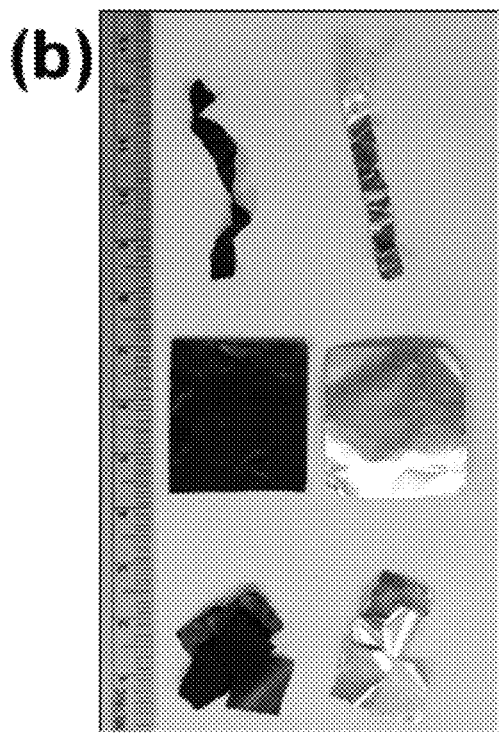
FIG. 11B provides a digital image showing recovered cathode materials and recovered aluminum foils from a NMC622 cathode.
Figure 11C:
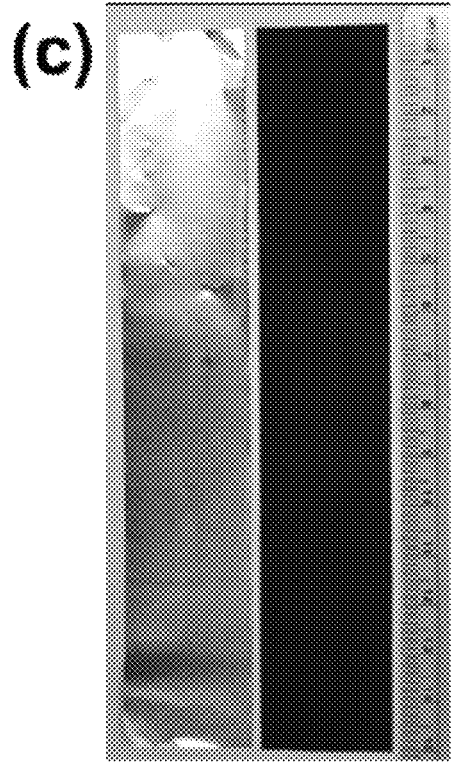
FIG. 11C provides a digital image showing a recovered cathode material and a recovered aluminum foil from another NMC622 cathode.
Figure 11D:
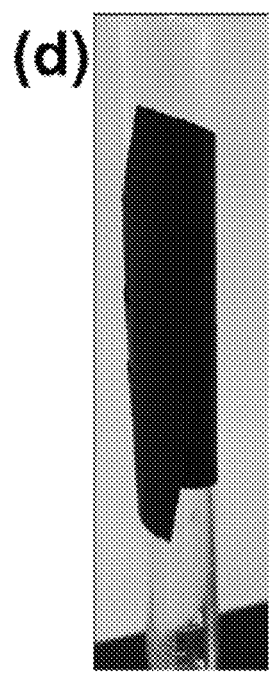
FIG. 11D provides a digital image showing a recovered cathode material from a flexible electrode.
Figure 12:
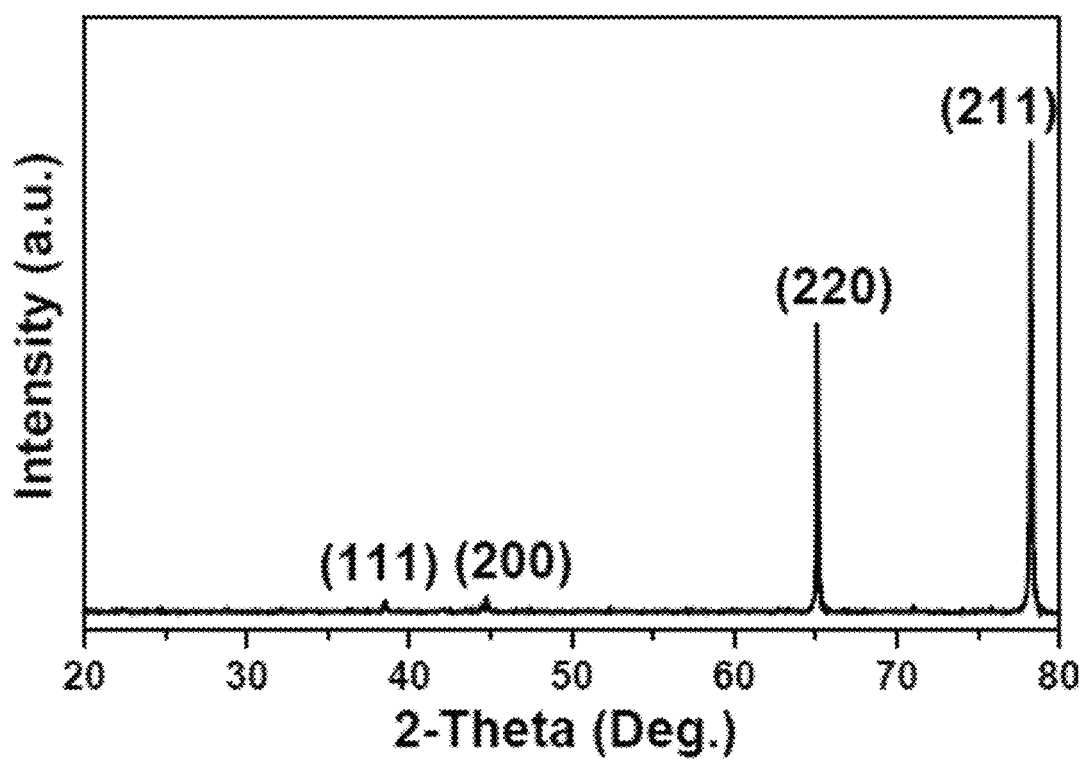
FIG. 12 provides an XRD pattern for recovered aluminum foil.

As shown in FIGS. 11A-11D, the delaminated NMC622 electrodes were recovered as self-supporting (FIGS. 11A-11C) and flexible strips (FIG. 11D). As such, these delaminated NMC622 electrodes were directly assembled into new cells and their electrochemical performance was evaluated. Using a coin cell with a half-cell configuration. The results of this evaluation, showing the charge-discharge performance of the NMC622 electrodes before and after delamination, are provided as charge-discharge curves at C/10 in the plot shown in FIG. 6. Notably, similar charge-discharge profiles were exhibited for the electrodes both before and after delamination, suggesting that delamination does not significantly affect the electrochemical performance of the recovered electrode. The delamination did slightly reduce the capacity of the recovered electrode material, likely because of the weaker contact between active materials resulting from the delamination. However, the delaminated electrode was freestanding and tested without the current collector, which may also have affected the charge transfer of the electrode.

In addition, the lithium content of the NMC622 cathode materials obtained via ICP-OES was reduced from 1.015 to 0.993 after delamination. This is believed to have been likely due to the lithium leaching into the delamination and washing steps. Nevertheless, the delaminated cathodes exhibited satisfactory electrochemical performance that was comparable to the untreated electrodes.

Without being limited or otherwise bound by theory, it is believed that the EG-based separation provides temperature-dependent rapid separation by promoting the deactivation of the binding capability of PVDF via hydrogen-bond disruption. It is also believed that the particularly rapid delamination, i.e., the extremely short treatment time, coupled with the EG solvent system utilized, ensures the active material will experience minimal, if any, degradation.

Figure 7A:
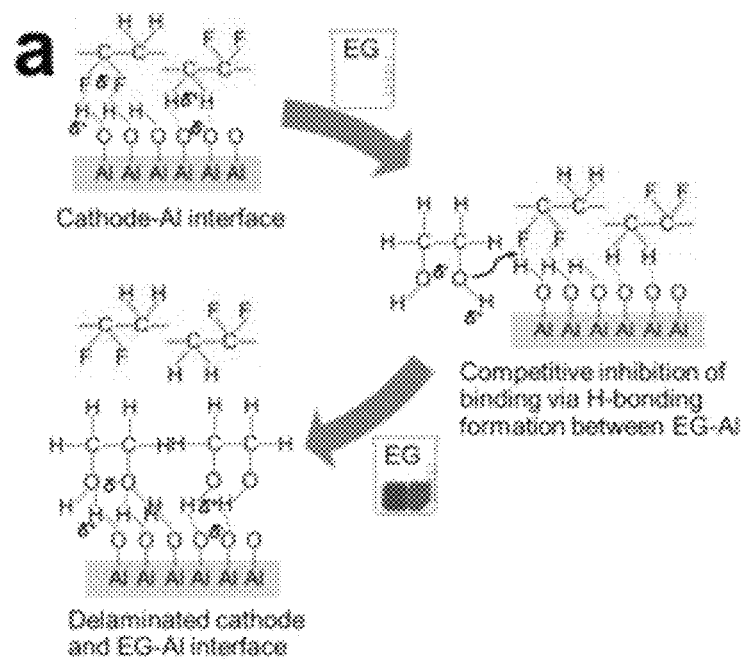
FIG. 7A provides a schematic representation of a possible delamination mechanism based on competitive binding inhibition via hydrogen bonding; and (b) a graphical comparison of hydrogen bonding ($\delta H$) strength for PVDF and various solvents including diethylene glycol (DEG), EG, glycerol, and water.

A possible delamination mechanism is believed to include the concept of competitive inhibition (i.e., the inhibition of binding a substrate due to occupation of a binding site by another molecule), whereby the EG solvent competitively hydrogen-bonds the aluminum and, thereby displaces the electrode material. Specifically, the electrode materials are tightly bonded to aluminum foil by a combination of forces, such as hydrogen bonding and van der Waals force. As illustrated in the scheme shown in FIG. 7A, PVDF can form hydrogen bonds with the surface of the aluminum foil, which typically has a thin passivation layer of aluminum oxide. The strength of hydrogen bonding for a solvent can be referred to as δH, which represents the energy from hydrogen bonds between molecules as one of the Hansen solubility parameters. EG has a high boiling point due to the strong hydrogen bonding originating from the two hydroxyl groups in one molecule. When the spent cathode is placed in EG, solvent molecules immediately diffuse to wet the interface between electrode materials and the aluminum surface through the interconnected pores in the electrode. With a high value of δH, EG can form strong hydrogen bonds with the thin oxidation layer of aluminum oxide, competitively replacing the bonding between the PVDF and substrate. It is believed that the porous nature of the electrode supports the rapid delamination, as well as the side-independent nature of the process, since the solvent diffusion is immediate and unaffected by electrode size.

Figure 7B:
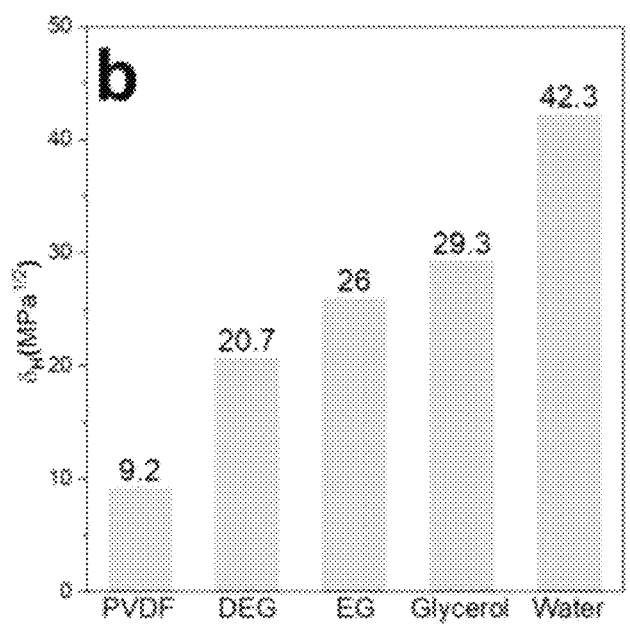
FIG. 7B provides a graphical comparison of hydrogen bonding ($\delta H$) strength for PVDF and various solvents including DEG, EG, glycerol, and water.

The δH values of the EG against comparative solvents, such as water, which also has strong hydrogen bonding with a δH value of 42.3 $MPa^{1/2}$ is plotted in FIG. 7B. However, water is not suitable for delamination under the current processes, as when the comparative example was performed the aluminum foil corroded, presumably due to lithium leaching from the NMC cathode and thereby making the water solution basic. As such, the corrosion of aluminum would contaminate the NMC particles by forming $Al(OH)_3$ precipitates on the cathode surfaces. In addition to EG, glycerol, and DEG, the latter two of which possess high values of δH (29.3 and 20.7 $MPa^{1/2}$, respectively), also may be used, and work well for delamination, thus further highlighting the significance of a competitive inhibition mechanism. As such, with regard to the EG solvent, it will be appreciated that any solvent (or combination) meeting the requirements and limitations described herein may theoretically be utilized, in place of the EG.

Figure 8A:
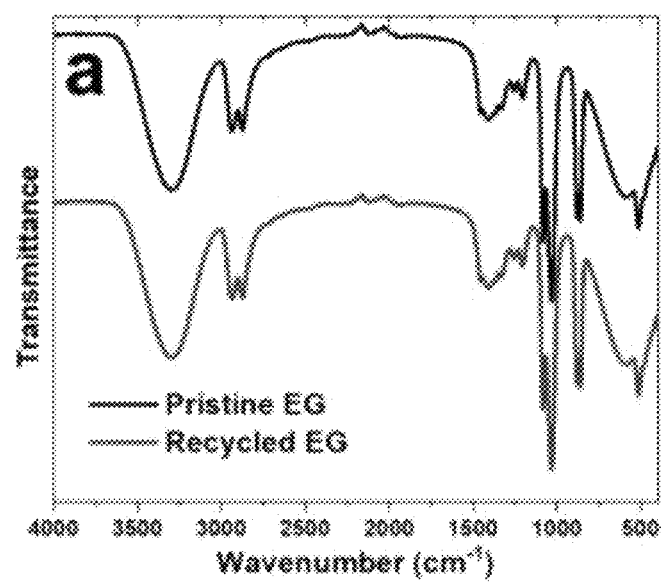
FIG. 8A provides a FTIR spectra of pristine EG (top) and recycled EG after the separation process (bottom).

Recycling aims to convert waste materials into new and useful materials. However, it will be appreciated that a more sustainable process will minimize the production of waste materials, ultimately leading to a closed-loop recycling process. To assess that capability here, EG was evaluated via FTIR before and after the delamination of cathode scraps. As shown, the spectra of recycled EG (bottom) shown in FIG. 8A is substantially the same as pristine EG (top), suggesting that the EG is robust and stable during delamination. As such, the EG may be captured and reused (i.e., recycled) in an EG-based closed-loop recycling system, which may substantially reduce the cost and environmental impact of recycling lithium-ion batteries. Specifically, it is a feature of the EG-based separation that battery materials can be recovered in an economically and environmentally sustainable recycling process.

Notably, the spent cathode in the preceding examples was washed in dimethyl carbonate to rinse off any residual electrolyte before the EG-based delamination, in order to rule out the mixing effect of electrolyte with the EG solvent.

Figure 8B:
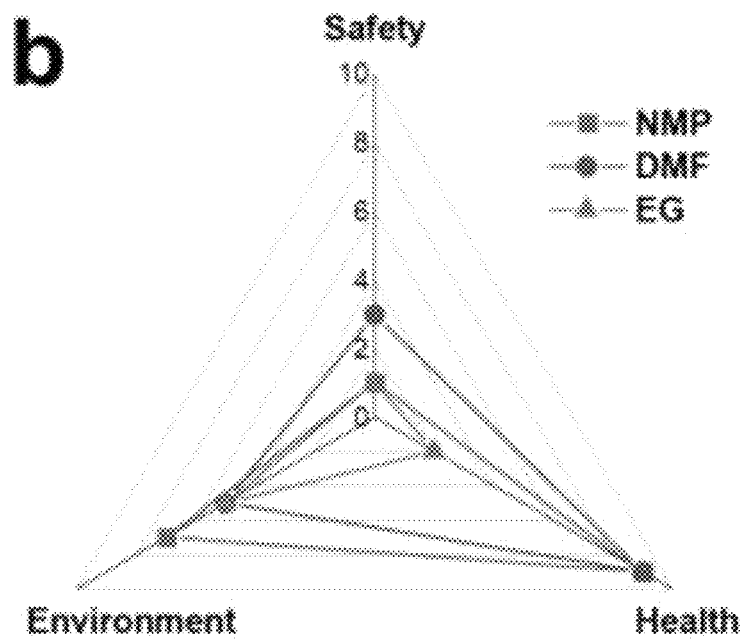
FIG. 8B provides a spider chart illustrating the comparative safety, health, and environmental impact of EG against other commonly used solvents (e.g. NMP and DMF).

FIG. 8B shows a spider chart for evaluating a solvent regarding safety, health and environment criteria according to the CHEM21 selection guide. Both NMP and DMF are reported as hazardous solvents, whereas EG is a recommended solvent. Compared to NMP and DMF solvents, EG degrades rapidly and is not persistent in air, surface water, soil, or groundwater. It is noteworthy that EG has a low toxicity inherently but produces toxic metabolites, emphasizing the importance of safe handling of this solvent in these processes. As a vital commodity chemical with an annual consumption around 20 million tons, EG has been widely used as antifreeze and as a polymer precursor, further highlighting the advantages of the separation process in the economic and environmental aspects. In addition to the delamination of cathode materials from aluminum foils, the developed process can also be applied to the separation of anode materials (graphite, carbon black, and PVDF binder) from their current collector, namely copper foil, which will substantially expand the recycling revenue.

Figure 9:
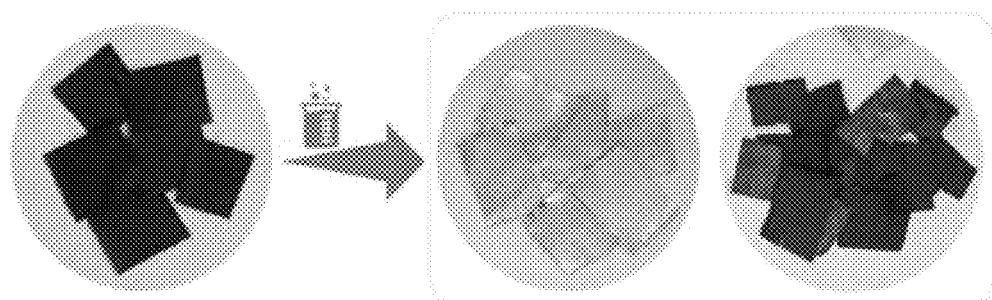
FIG. 9 provides digital images showing the separation of anode materials from copper foils.

While cathodic materials and aluminum foils were investigated in depth for purposes of probing the applicability and scope outlined above, the EG-based process was also utilized successfully on anode materials and the respective current collectors as well. In particular, anode materials comprising graphite, carbon black, and PVDF binder were successfully delaminated from copper foils. As shown in FIG. 9, the anode material was completely separated from copper foil to which it was bound, according to the method above, with the copper foil being recovered as a whole, shiny piece free from corrosion or residue on its surface. It is believed that other materials may also be suitable/compatible with the process described herein, and one of skill in the art will appreciate how to select such a solvent and material or otherwise optimize conditions for recovering other materials from batteries being recycled.

In view of the description and examples provided herein, it will be readily appreciated that the method provides an economical and scalable route to rapidly delaminate electrode materials, including a cathode and anode, from their respective current collectors in the electrodes of spent lithium-ion batteries. As demonstrated above, the electrode materials may be completely peeled off from the metal foils in several seconds, which is believed to represent the most efficient and rapid process reported. Moreover, the recovered electrode materials were intact in terms of their crystal structure, morphology, and electrochemical performance. The current collectors, including aluminum foils and copper foils, were fully recovered with no corrosion or remaining residues. In addition to the rapid and damage-free separation, the polyol fluid was directly recycled and reused for continuous delamination, which closes the recycling loop without producing secondary waste. This environmentally friendly and cost-effective separation process thus presents a closed-loop recycling approach.

Additionally, the method described herein outperforms existing separation methods. In particular, the present embodiments avoid the use of toxic and volatile solvents, which otherwise increase the cost and causes pollutions and health issues. Moreover, the method also only requires a low heating temperature within a short reaction time range, leading to low energy consumption. Further, the separation of the solid from the polyol solvents can be easily realized by filtration, making the solvents be reused continuously. Further still, the method can be applied to both cathode and anode composite electrodes. In addition to the benefits and advantages above, the method also yields a nearly 100% peeling-off efficiency without damaging the electrode materials or etching the metal foils, thus being particularly suitable for direct recycling of batteries with such materials.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A method of recycling lithium-ion batteries, said method comprising:
    isolating a composite electrode from a spent lithium-ion battery, the composite electrode comprising an electrode material adhered to a current collector with a polyvinylidene difluoride (PVDF) binder;
    contacting the composite electrode with a polyol fluid capable of releasing the PVDF binder from the current collector, thereby forming a mixture;
    delaminating the electrode material from the current collector to give a free electrode material and a free current collector; and
    recovering each of the free electrode material and the free current collector from the mixture.

2. The method of claim 1, wherein: (i) the polyol fluid comprises a glycol, a glycerol, or both; (ii) the electrode material and the current collector are delaminated at a temperature of from 20 to 198° C.; (iii) the electrode material and the current collector are fully delaminated within a time of from 2 seconds to 120 minutes after forming the mixture; or (iv) any combination of (i)-(iii).

3. The method of claim 1, wherein: (i) the polyol fluid comprises an alkylene glycol; (ii) the electrode material and the current collector are delaminated at a temperature of from 100 to 198° C.; (iii) the electrode material and the current collector are fully delaminated within a time of from 2 to 120 seconds after forming the mixture; or (iv) any combination of (i)-(iii).

4. The method of claim 1, wherein: (i) the polyol fluid is ethylene glycol; (ii) the electrode material and the current collector are delaminated at a temperature of from 160 to 198° C.; (iii) the electrode material and the current collector are fully delaminated within a time of from 2 to 6 seconds after forming the mixture; or (iv) any combination of (i)-(iii).

5. The method of claim 1, wherein contacting the composite electrode with the polyol fluid comprises disposing the composite electrode in the polyol fluid, and wherein the polyol fluid: (i) is selected from ethylene glycol, diethylene glycol, glycerol, and combinations thereof; (ii) does not substantially dissolve the PVDF binder; (iii) remains substantially unreacted during the method; or (iv) any combination of (i)-(iii).

6. The method of claim 1, further comprising:
    collecting the polyol fluid after recovering the free electrode material and the free current collector;
    optionally purifying the polyol fluid; and
    reusing the polyol fluid in another round of the method to delaminate another composite electrode.

7. The method of claim 1, wherein delaminating the electrode material from the current collector: (i) comprises peeling a film of the electrode material from the current collector; (ii) exhibits a peel-off efficiency of greater than 98%; or (iii) both (i) and (ii).

8. The method of claim 1, wherein the composite electrode is further defined as a composite cathode, wherein the electrode material is further defined as a cathode active material.

9. The method of claim 8, wherein in the composite cathode: (i) the cathode active material comprises a lithium-bearing metal oxide; (ii) the current collector comprises aluminum; or (iii) both (i) and (ii).

10. The method of claim 8, wherein: (i) the cathode active material comprises a lithium nickel manganese cobalt oxide; (ii) the current collector is an aluminum sheet or foil; or (iii) both (i) and (ii).

11. The method of claim 1, wherein the composite electrode is further defined as a composite anode, wherein the electrode material is further defined as an anode active material.

12. The method of claim 11, wherein in the composite anode: (i) the anode active material comprises an electroconductive carbon compound; (ii) the current collector comprises copper; or (iii) both (i) and (ii).

13. The method of claim 11, wherein in the composite anode: (i) the anode active material comprises graphite and/or carbon black; (ii) the current collector is a copper sheet or foil; or (iii) both (i) and (ii).

14. The method of claim 1, wherein isolating the composite electrode comprises: (i) separating the composite electrode from one or more other components of the spent lithium-ion battery; (ii) washing the composite electrode with a solvent to remove a residual electrolyte therefrom; or (iii) both (i) and (ii).

15. The method of claim 1, wherein: (i) the mixture comprises a solid-to-liquid ratio of about 1:10 wt./wt., based on the weights of the composite electrode and the polyol fluid; (ii) delaminating the electrode material from the current collector comprises mechanically agitating the mixture; or (iii) both (i) and (ii).

16. The method of claim 1, wherein recovering each of the free electrode material and the free current collector from the mixture comprises: (i) filtering the mixture to extract at least one of the free electrode material and the free current collector; (ii) sizing the free electrode material; (iii) rinsing the at least one of the free electrode material and the free current collector with a solvent to remove a residual amount of the polyol fluid therefrom; or (iv) any combination of (i)-(iii).

17. The method of claim 1, wherein the free electrode material recovered from the mixture: (i) comprises substantially the same morphology as the electrode material; (ii) comprises substantially the same chemical composition as the electrode material; (iii) comprises substantially the same electrochemical performance as the electrode material; (iv) is directly reusable in the preparation of a new composite electrode; or (v) any combination of (i)-(iv).

18. The method of claim 1, wherein the free current collector recovered from the mixture is substantially free from: (i) corrosion; (ii) residual electrode material; or (iii) both (i) and (ii).

19. The method of claim 1, further comprising preparing a new composite electrode using the free electrode material.

20. The method of claim 19, further comprising preparing a new lithium-ion battery using the new composite electrode.

\* \* \* \* \*